(12) United States Patent
Seto

(10) Patent No.: US 9,092,493 B2
(45) Date of Patent: Jul. 28, 2015

(54) ADAPTIVE WAREHOUSE DATA VALIDATION TOOL

(71) Applicant: International Business Machines Corporation, Armonk, NY (US)

(72) Inventor: Harold Seto, Ottawa, CA (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 13/776,425

(22) Filed: Feb. 25, 2013

(65) Prior Publication Data

US 2014/0244569 A1 Aug. 28, 2014

(51) Int. Cl.
*G06F 17/30* (2006.01)

(52) U.S. Cl.
CPC .... *G06F 17/30563* (2013.01); *G06F 17/30371* (2013.01); *G06F 17/30424* (2013.01)

(58) Field of Classification Search
USPC .......................... 707/601, 602, 603, 690, 825
See application file for complete search history.

(56) References Cited

U.S. PATENT DOCUMENTS

| | | | | |
|---|---|---|---|---|
| 8,713,522 B2* | 4/2014 | Blakeley et al. | ............... | 717/120 |
| 8,731,988 B2* | 5/2014 | Barrett et al. | ................ | 705/7.12 |
| 2007/0203933 A1* | 8/2007 | Iversen et al. | ................ | 707/102 |
| 2007/0239500 A1* | 10/2007 | Barrett et al. | ..................... | 705/7 |
| 2009/0150447 A1* | 6/2009 | Anderson et al. | ............. | 707/200 |
| 2009/0172047 A1* | 7/2009 | Boyko et al. | ................ | 707/204 |
| 2010/0250485 A1* | 9/2010 | Dodds et al. | .................. | 707/602 |
| 2010/0250566 A1* | 9/2010 | Paul | .............................. | 707/756 |
| 2012/0284690 A1* | 11/2012 | Blakeley et al. | ............. | 717/120 |
| 2012/0290527 A1* | 11/2012 | Yalamanchilli | ............... | 707/602 |

\* cited by examiner

*Primary Examiner* — Cam-Linh Nguyen
(74) *Attorney, Agent, or Firm* — Shumaker & Sieffert, P.A.

(57) ABSTRACT

Techniques for data validation may include dynamically generating one or more database queries to be performed on a target data warehouse and a baseline data warehouse based on warehouse model metadata for the target data warehouse and the baseline data warehouse. The techniques may further include executing the one or more database queries against the target data warehouse and the baseline data warehouse to receive one or more data sets from the baseline data warehouse and one or more data sets from the target data warehouse. The techniques may further include comparing the one or more data sets from the baseline data warehouse and the one or more data sets from the target data warehouse to validate target data in the target data warehouse against baseline data in the baseline data warehouse.

11 Claims, 14 Drawing Sheets

ADAPTIVE WAREHOUSE DATA VALIDATION TOOL

TECHNICAL FIELD

The disclosure relates to data validation in computing systems.

BACKGROUND

An organization may utilize a data warehouse as a central repository of data that integrates data from multiple data sources. As the organization's data storage needs change, the organization may migrate its central repository of data from the data warehouse into a new data warehouse. The new data warehouse may be a newer version of the prior data warehouse or may comprise a different data warehouse platform. The data in the new data warehouse may be validated to determine that data was properly migrated from the prior data warehouse to the new data warehouse. Data warehouses may also be validated to determine if a data warehouse that is loaded using one version of the data model is consistent with a data warehouse that is loaded using another version of the data model.

SUMMARY

In one aspect, the disclosure is directed to a method for validating data in a data warehouse. The method may include dynamically generating, by at least one processor, one or more database queries to be performed on a target data warehouse and a baseline data warehouse based on warehouse model metadata for the target data warehouse and the baseline data warehouse. The method may further include executing, by the at least one processor, the one or more database queries against the target data warehouse and the baseline data warehouse to receive one or more data sets from the baseline data warehouse and one or more data sets from the target data warehouse. The method may further include comparing, by the at least one processor, the one or more data sets from the baseline data warehouse and the one or more data sets from the target data warehouse to validate target data in the target data warehouse against baseline data in the baseline data warehouse In another aspect, the disclosure is directed to a computer system for validating data in a data warehouse. The computer system may include one or more processors. The computer system may further include one or more computer-readable memories. The computer system may further include one or more computer-readable tangible storage devices. The computer system may further include program instructions stored on at least one of the one or more computer-readable tangible storage devices for execution by at least one of the one or more processors via at least one of the one or more computer-readable memories to: dynamically generate one or more database queries to be performed on a target data warehouse and a baseline data warehouse based on warehouse model metadata for the target data warehouse and the baseline data warehouse, and execute the one or more database queries against the target data warehouse and the baseline data warehouse to receive one or more data sets from the baseline data warehouse and one or more data sets from the target data warehouse; and compare the one or more data sets from the baseline data warehouse and the one or more data sets from the target data warehouse to validate target data in the target data warehouse against baseline data in the baseline data warehouse In another aspect, the disclosure is directed to a computer program product for validating data in a data warehouse. The computer program product may comprise a computer readable storage medium having program code embodied therewith. The program code may be readable/executable by at least one processor to perform a method. The method may include dynamically generating, by the at least one processor, one or more database queries to be performed on a target data warehouse and a baseline data warehouse based on warehouse model metadata for the target data warehouse and the baseline data warehouse. The method may further include executing, by the at least one processor, the one or more database queries against the target data warehouse and the baseline data warehouse to receive one or more data sets from the baseline data warehouse and one or more data sets from the target data warehouse. The method may further include comparing, by the at least one processor, the one or more data sets from the baseline data warehouse and the one or more data sets from the target data warehouse to validate target data in the target data warehouse against baseline data in the baseline data warehouse The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
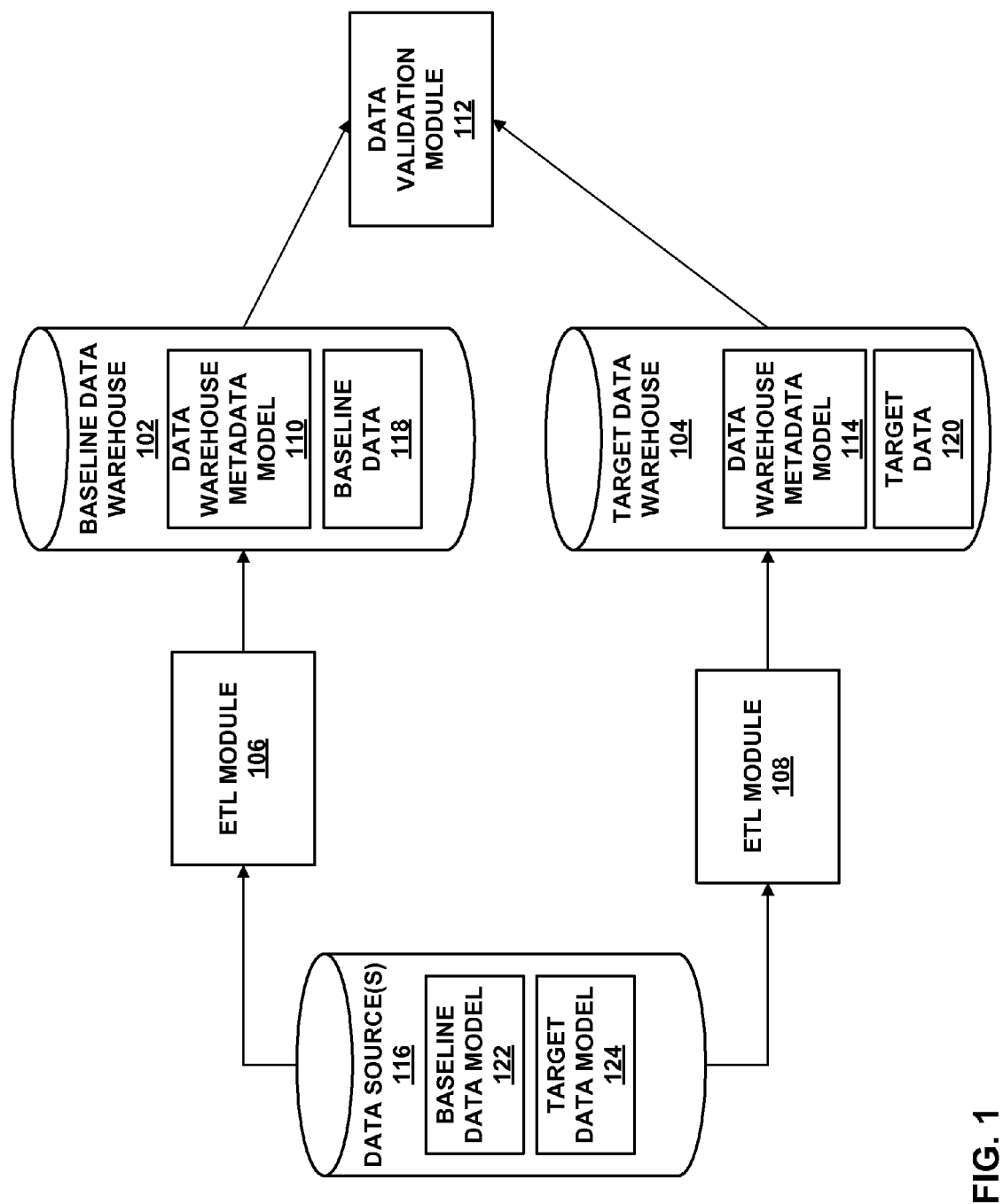
FIG. 1 is a block diagram illustrating a data warehouse validation system according to some aspects of the present disclosure.

In general, the disclosure is directed to techniques for performing data validation for a data warehouse. The target data warehouse and the baseline data warehouse may be queried for the same warehouse object that resides in each warehouse. The resulting warehouse objects may be compared to determine if the warehouse object was correctly loaded with the same data in both the baseline data warehouse and the target data warehouse.

In some examples, database queries may be manually generated, such as by a user, to query the baseline data warehouse and the target data warehouse for a specified warehouse object. Such database queries may include table columns and join statements to extract the warehouse object from the respective data warehouses. However, this process may require the user generating the queries to have an intimate understanding of the structure of the data warehouses, and may not take advantage of a data warehouse metadata model that provides information regarding the structure of the data warehouses. Furthermore, the user may be required to perform additional work to normalize the data formats of the warehouse objects retrieved from different versions or platforms of data warehouses.

In accordance with the present disclosure, a data validation module on a computing device may be able to intelligently and dynamically generate queries for warehouse objects in the baseline data warehouse and the target data warehouse. The generated queries may include the proper columns and join statements, for example, to reference the tables that include the warehouse objects. The results of the queries for the baseline data warehouse and the target data warehouse may be normalized and compared to validate that the data was properly loaded into and stored in the target data warehouse.

In some examples, a data warehouse may be a database or any other suitable data repository for integrating and storing data loaded from operational systems of an organization. Data stored in a data warehouse may be structured according to a warehouse metadata model for the data warehouse. The warehouse metadata model for a data warehouse may provide a business view of the data in the data warehouse. For example, the business view provided by the metadata model may include organizing data according to business areas of the organization, formatting items into human-readable format, and the like. The warehouse metadata model may also represent the data in the data warehouse as one or more fact tables that are each connected to dimension tables.

The data validation module may generate the queries for warehouse objects in the baseline data warehouse and the target data warehouse based at least in part on the warehouse metadata model for the warehouse objects in the baseline data warehouse and the target data warehouse. In one example, the generated queries may include the table names and join statements for the warehouse objects based on the metadata included in the warehouse metadata model for the warehouse objects. In this example, the user of the data warehouses may not necessarily need to have specialized knowledge of the table names and join statements.

FIG. 1 is a block diagram illustrating a data warehouse computing system according to some examples of the present disclosure. As shown in FIG. 1, one or more data sources 116 may include one or more versions of a data model, including baseline data model 122 and target data model 124 that may be a different version of baseline data model 122. Extract, transform, and load (ETL) module 106 may extract data associated with baseline data model 122 from one or more data sources 116, transform the extracted data, and load the extracted and transformed data into baseline data warehouse 102. Correspondingly, ETL module 108 may extract data associated with target data model 124 from one or more data sources 116, transform the extracted data, and load the extracted and transformed data into target data warehouse 104. Typically, such data may be loaded into respective baseline data warehouse 102 and target data warehouse 104 on a regular basis, such as on a daily basis, as per the business requirements of an enterprise.

Baseline data 118 in baseline data warehouse 102 may be modeled as warehouse objects according to metadata stored in data warehouse metadata model 110, while target data 120 in target data warehouse 104 may be modeled as warehouse objects according to metadata stored in data warehouse metadata model 114, so that baseline data 118 in baseline data warehouse 102 and target data 120 in target data warehouse 104 may be abstracted as warehouse objects regardless of the underlying structure of baseline data warehouse 102 and target data warehouse 104. Data warehouse metadata models 110 and 114 may include metadata stored, such as in tables, in respective baseline data warehouse 102 and target data warehouse 104, so that respective baseline data warehouse 102 and target data warehouse 104 may each include data warehouse tables and data model tables. Alternatively, metadata of metadata models 110 and 114 may be stored outside of baseline data warehouse 102 and target data warehouse 104, such as in databases and storage devices external to baseline data warehouse 102 and target data warehouse 104.

To validate target data 120 loaded into target data warehouse 104 against baseline data 118 loaded into baseline data warehouse 102 (e.g., validating the data warehouse tables in target data warehouse 104 against the data warehouse tables in baseline data warehouse 102), data validation module 112 may compare a warehouse object in target data warehouse 104 with a corresponding warehouse object in baseline data warehouse 102. Data validation module 112 may query, such as via Structured Query Language (SQL) or any other suitable querying techniques, data warehouse metadata model 110 for information regarding the warehouse object in baseline data warehouse 102 and may similarly query data warehouse metadata model 114 for information regarding the corresponding warehouse object in target data warehouse 104. In response to receiving the information from data warehouse metadata model 110 and data warehouse metadata model 114, data validation module 112 may dynamically generate queries, such as SQL queries or any other suitable queries, to extract information regarding the respective warehouse objects in baseline data warehouse 102 and target data warehouse 104 based on the information received from data warehouse metadata model 110 and data warehouse metadata model 114. Because a warehouse object may include multiple database tables (e.g., fact and dimension tables as discussed below with respect to FIG. 2), the queries generated by data validation module 112 may include join statements to join such tables.

Data validation module 112 may execute the queries against baseline data warehouse 102 and target data warehouse 104 to receive information regarding the respective warehouse object. In one example, such information may be converted by data validation module 112 into text and may be stored in a text file for the warehouse object in baseline data warehouse 102 and a text file for the warehouse object in target data warehouse 104. Such information may also be stored in any other suitable fashion. Data validation module 112 may compare the information received from baseline data warehouse 102 and target data warehouse 104 to determine differences, if any, between the warehouse object stored in baseline data warehouse 102 and the corresponding warehouse object stored in target data warehouse metadata model 114. For example, data validation module 112 may determine if there are any differences in the data contained within tables of the warehouse object. Data validation module 112 may also verify that the dimension tables in the warehouse object in target data warehouse 104 are properly referenced by a corresponding fact table, such as by validating the foreign key of the fact table. Data validation module 112 may present the results of such comparison, such as in a web page, for user review.

One or more potential advantages of the techniques described herein may include that data warehouses may be more easily and reliably validated. Instead of potentially relying on a user's knowledge of the structure of a data warehouse to be validated, data validation module 112 may reliably determine the structure of a data warehouse by querying its corresponding data warehouse metadata model. Thus, mistakes in validating a data warehouse may be decreased.

Figure 2:
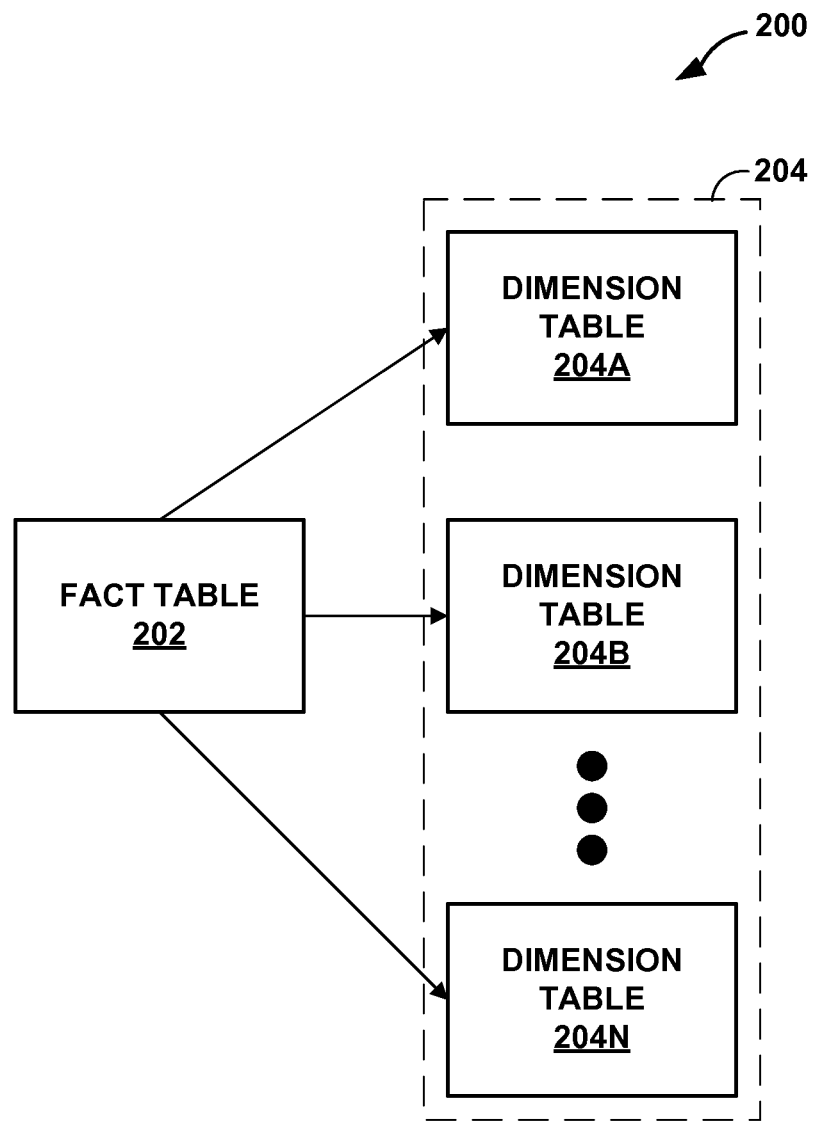
FIG. 2 is a block diagram illustrating an example warehouse object according to some aspects of the present disclosure.

FIG. 2 is a block diagram illustrating an example warehouse object, such as a warehouse object stored in baseline data warehouse 102 or target data warehouse 104, according to some aspects of the present disclosure. As shown in FIG. 2, warehouse object 200 may include fact table 202 that references one or more dimension tables 204A-204N ("dimension tables 204"). Fact table 202 may typically include metrics or facts of a business process, while referenced dimension tables 204 may typically include descriptive attributes. Fact table 202 may include foreign keys that each refer to a primary key included in one of dimension tables 204 referenced by fact table 202. In this way, fact table 202 may refer to dimension tables 204 to make up warehouse object 200. In one example, data validation module 112 shown in FIG. 1 may verify that a given foreign key matches the referenced dimension primary key of example warehouse object 200 to validate warehouse object 200.

Figure 3A:
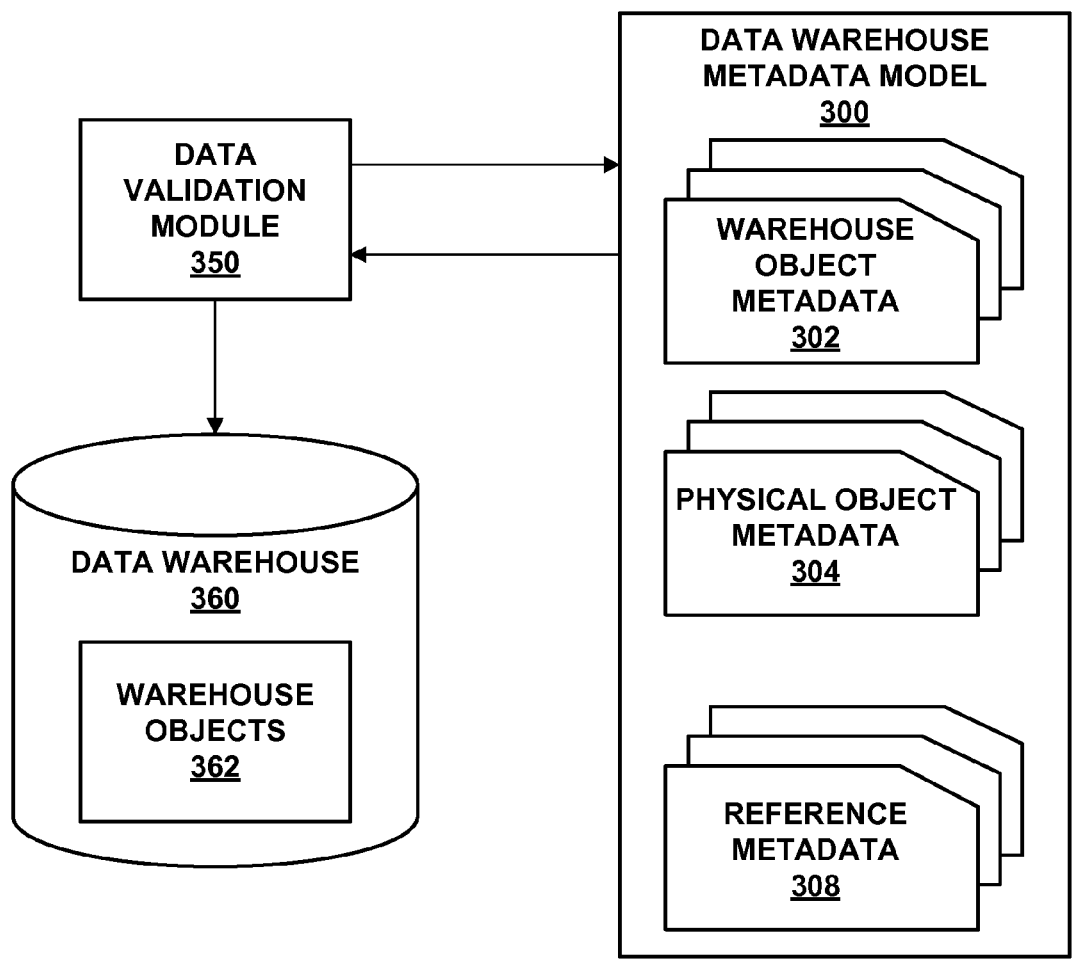
FIGS. 3A-3D are block diagrams illustrating examples of one or more data validation technique according to some aspects of the present disclosure.

FIGS. 3A-3D are block diagrams illustrating one or more example data validation techniques according to some aspects of the present disclosure. As shown in FIG. 3A, data validation module 350, similar to data validation module 112 shown in FIG. 1, may query data warehouse metadata model 300, similar to data warehouse metadata models 110 and 114 shown in FIG. 1, for information regarding warehouse objects 362 stored in data warehouse 360, similar to baseline data warehouse 102 and target data warehouse 104 show in FIG. 1. In some examples, data warehouse metadata model 300 may be stored in data warehouse 360. For example, data validation module 350 may query warehouse metadata model 300 for the structure of warehouse objects 362 and to determine how warehouse objects 362 are stored and modeled in data warehouse 360. As one example, for a warehouse object in warehouse objects 362, data validation module 350 may determine, based on metadata in the data warehouse metadata model 300, the physical database table and column that the warehouse object is stored in, information regarding the fact table and the dimension tables that the warehouse object references, and the like.

Data warehouse metadata model 300 may include warehouse object metadata 302, physical object metadata 304, and reference metadata 308. Physical object metadata 304 may include information regarding the physical fact and dimension database tables of warehouse objects 362 residing in data warehouse 360. Warehouse object metadata 302 may include information regarding how the fact and dimension tables are modeled in a data warehouse object model. Reference metadata 308 may include information regarding references between fact tables and dimension tables of warehouse objects 362 in data warehouse 360.

To compare a warehouse object stored in a baseline data warehouse against the corresponding warehouse object stored in a target data warehouse, data validation module 350 may generate and execute a first query against data warehouse metadata model 300 to receive information regarding the warehouse object stored in the baseline data warehouse, and may generate and execute a second query against data warehouse metadata model 300 to receive information regarding the corresponding warehouse object stored in the target data warehouse. In some examples, data warehouse metadata model 300 for data warehouse 360 may be stored in data warehouse 360, so that each data warehouse 360 may store its own data warehouse metadata model 300. In some other examples, data warehouse metadata model 300 may not be stored in data warehouse 360.

Figure 3B:
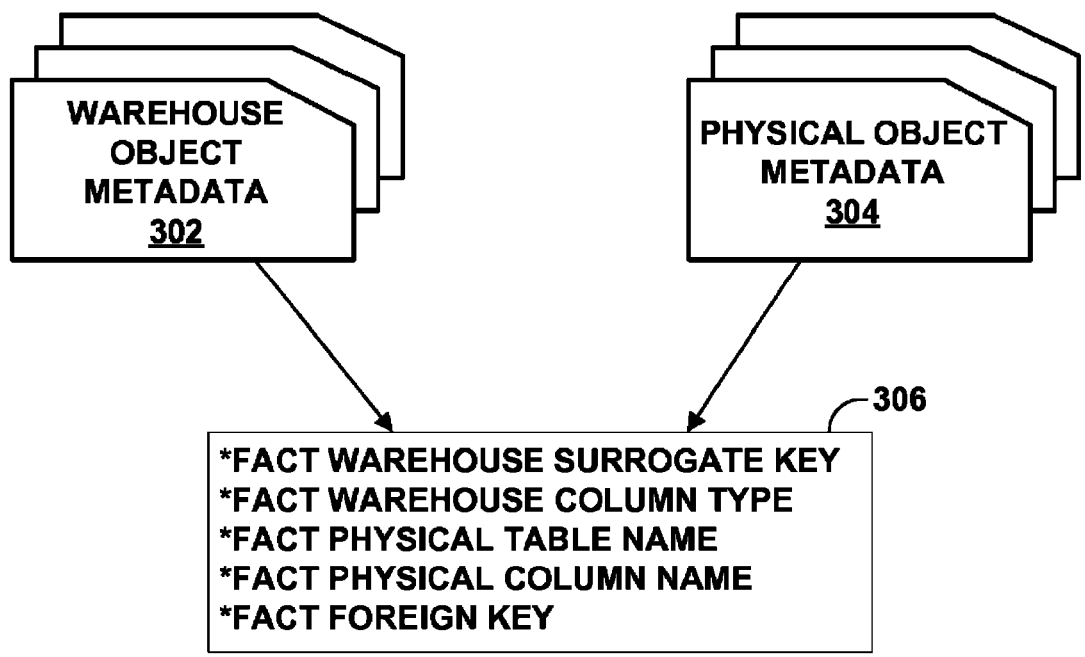

As shown in FIG. 3B, data validation module 350 may, for a warehouse object including a fact table that references one or more dimension tables, query warehouse object metadata 302 and physical object metadata 304 in data warehouse metadata model 300 for the fact table's warehouse surrogate key, fact table's warehouse column type, fact table's physical table name, fact table's physical column name, and fact table's foreign key. The fact table's warehouse surrogate key may be a unique identifier for the fact table in the warehouse model. The fact table's foreign key may be a key that is used to cross-reference dimension tables. Based on the fact table's foreign key, data validation module 350 may determine the dimension tables that are referenced by the fact table. The information resulting from querying warehouse object metadata 302 and physical object metadata 304 may be stored in object information 306. Object information 306, in some examples, may be a file (e.g., text file) or any other suitable means for storing the resulting information. As shown in FIG. 3B, one or more of the information in object information 306 is represented with an asterisk to indicate that they were retrieved and stored into object information 306 as a result of the query shown in FIG. 3B.

Figure 3C:
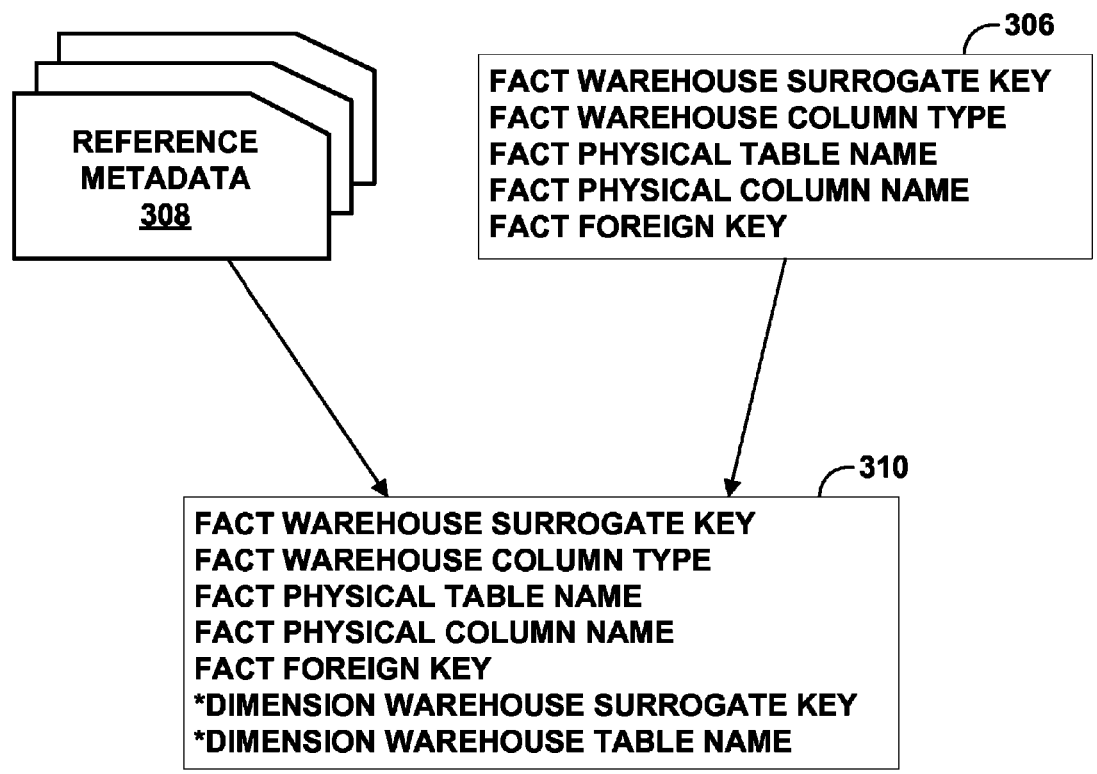

As shown in FIG. 3C, the data validation module 350 may, for each foreign key object in the fact table, such as for every dimension table referenced by the fact table, query reference metadata 308 for the dimension warehouse surrogate key for that dimension table and the dimension warehouse table name for that dimension table. The dimension warehouse surrogate key may be a unique identifier for the dimension table in the warehouse model. Such information resulting from the query may be joined to or otherwise combined with the object information 306 resulting from the query described with respect to FIG. 3B to produce object information 310. Object information 310, in some examples, may be a file (e.g., text file) or any other suitable means for storing the resulting information. As shown in FIG. 3C, one or more of the information in object information 310 is represented with an asterisk to indicate that they were retrieved and stored into object information 310 as a result of the query shown in FIG. 3C, as opposed to information retrieved as a result of the query shown in FIG. 3B.

Figure 3D:
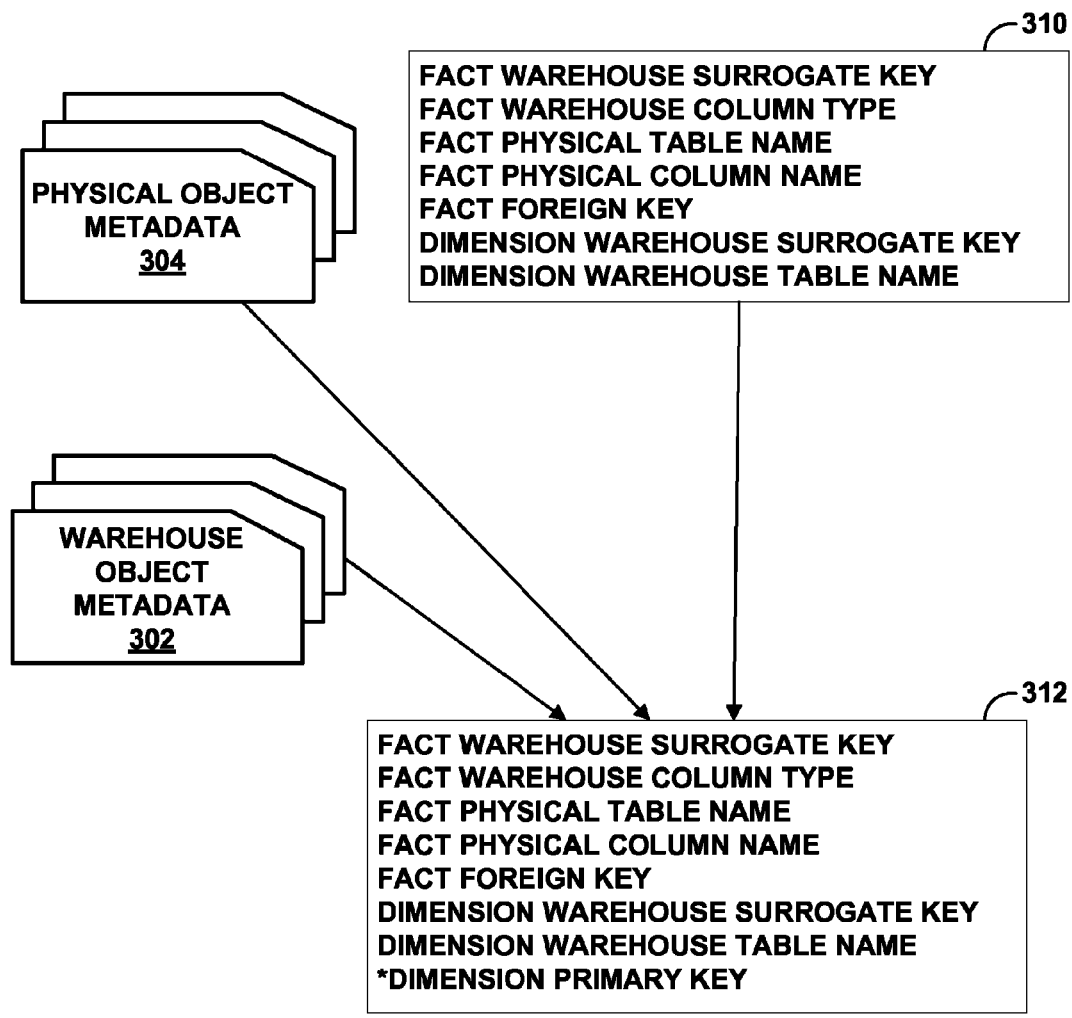

As shown in FIG. 3D, data validation module 350 may, for each foreign key object in the fact table, such as for every dimension table referenced by the fact table, further query physical object metadata 304 and warehouse object metadata 302 for the dimension primary key for that dimension table. Such information resulting from the query may be joined to or otherwise combined with object information 310 resulting from the queries described with respect to FIG. 3B and FIG. 3C to produce object information 312. Object information 312, in some examples, may be a file (e.g., text file) or any other suitable means for storing the resulting information. As shown in FIG. 3D, one or more of the information in object information 312 is represented with an asterisk to indicate that they were retrieved and stored into object information 312 as a result of the query shown in FIG. 3D, as opposed to information retrieved as a result of the query shown in FIG. 3B and 3C.

The query generated by data validation module 350 may be executed to produce information from data warehouse metadata model 300 regarding warehouse objects in data warehouse 360. Based on the information resulting from the querying of the data warehouse metadata model 300, data validation module 350 may dynamically generate queries for warehouse objects in data warehouse 360. Data validation module 350 may, for a warehouse object, query for a fact table and for dimension tables referenced by the fact table from data warehouse 360. Querying for the fact table and dimension tables may include querying for columns and tables in the underlying database of data warehouse 360. Data validation module 350 may join or otherwise combine the fact table and the dimension tables resulting from the query, and may, in one example, output information included in the warehouse object as text in a text file that represents the warehouse object. For example, data and other information stored in the tables in the warehouse object may be outputted into a text file.

Data validation module 350 may also normalize the formatting (e.g., numbers, dates) of the information generated from multiple data warehouses (e.g., baseline data warehouse and target data warehouse), so that the information (e.g., two text files) may be compared. For instance, the text file outputted as a result of querying a baseline data warehouse, such as baseline data warehouse 102 shown in FIG. 1, may be compared to the text file outputted as a result of querying a target data warehouse, such as target data warehouse 104 shown in FIG. 1, to compare the respective warehouse objects stored in the baseline data warehouse and in the target data warehouse. In this particular example, by outputting the warehouse objects as text files, warehouse objects stored on different data warehouse platforms may be more easily compared. For example, the values contained in the same corresponding columns of tables in the respective warehouse objects may be compared.

Figure 4:
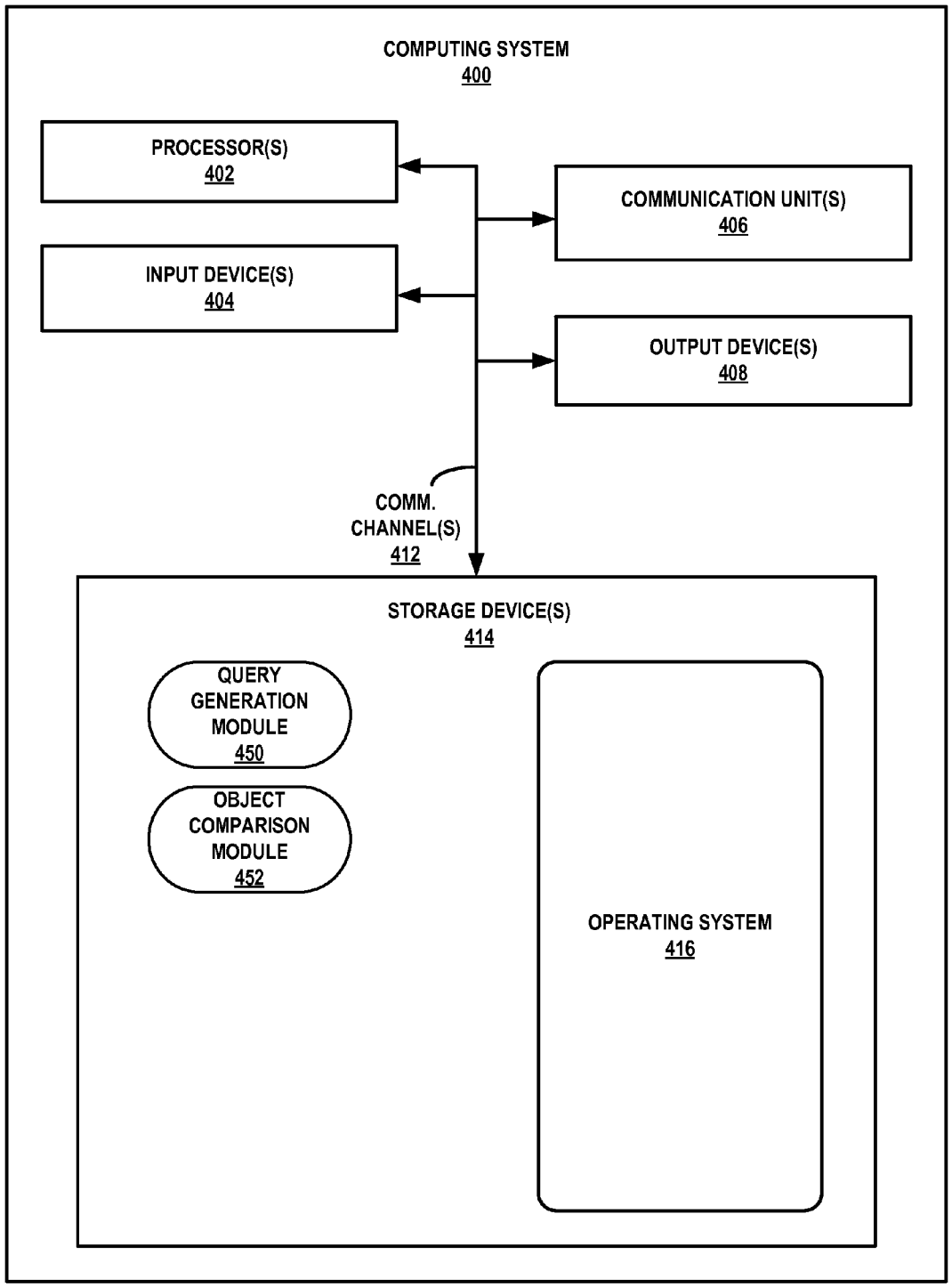
FIG. 4 is a block diagram illustrating an example computing system according to some aspects of the present disclosure.

FIG. 4 is a block diagram illustrating a computing system according to some aspects of the present disclosure. Computing system 400 of FIG. 4 is described below within the context of FIG. 1, so that computing system 400 may be one example of a computing system that queries baseline data warehouse 102 and target data warehouse 104 shown in FIG. 1 and compares data resulting from the queries of baseline data warehouse 102 and target data warehouse 104. In other examples, computing device 400 can include fewer, additional, or different components compared to those illustrated in FIG. 4. As shown in the example of FIG. 4, computing device 400 may include one or more processors 402, one or more input devices 404, one or more communication units 406, one or more output devices 408, and one or more storage devices 414. In this example, storage devices 414 of computing device 400 may include operating system 416, query generation module 450, and object comparison module 452. Communication channels 412 may interconnect each of the components 402, 404, 406, 408, and 414 for inter-component communications (physically, communicatively, and/or operatively). In some examples, communication channels 412 may include a system bus, a network connection, an inter-process communication data structure, or any other method for communicating data.

One or more input devices 404 of computing device 400 may receive input. Examples of input are tactile, audio, and video input. Input devices 404 of computing device 400, in one example, includes a presence-sensitive display, touch-sensitive screen, mouse, keyboard, voice responsive system, video camera, microphone or any other type of device for detecting input from a human or machine.

One or more output devices 408 of computing device 400 may generate output. Examples of output are tactile, audio, and video output. Output devices 408 of computing device 400, in one example, include a presence-sensitive display, sound card, video graphics adapter card, speaker, cathode ray tube (CRT) monitor, liquid crystal display (LCD), or any other type of device for generating output to a human or machine.

One or more communication units 406 of computing device 400 may communicate with wired or wireless external devices via one or more networks by transmitting and/or receiving network signals on the one or more networks. For example, computing device 400 may use communication unit 406 to transmit and/or receive radio signals on a radio network such as a cellular radio network. Likewise, communication units 406 may transmit and/or receive satellite signals on a satellite network such as a GPS network. Examples of communication unit 406 include a network interface card (e.g. such as an Ethernet card), an optical transceiver, a radio frequency transceiver, a GPS receiver, or any other type of device that can send and/or receive information. Other examples of communication units 406 may include Bluetooth®, GPS, 3G, 4G, and Wi-Fi® radios found in mobile devices as well as Universal Serial Bus (USB) controllers.

One or more storage devices 414 within computing device 400 may store information required for use during operation of computing device 400. Storage devices 414, in some examples, have the primary purpose of being short term and not long-term computer-readable storage mediums. Storage devices 414 on computing device 400 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 414 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 414 may store program instructions and/or data associated with query generation module 450 and object comparison module 452.

One or more processors 402 may implement functionality and/or execute instructions within computing device 400. For example, processors 402 on computing device 400 may read and execute instructions stored by storage devices 414 that execute the functionality of query generation module 450 and object comparison module 452. These instructions executed by processors 402 may cause computing device 400 to store information within storage devices 414 during program execution. Processors 402 may execute modules 450 and 452 to perform various actions. In one example, modules 450 and 452 may be part of data validation module 112 in FIG. 1, and data validation module 350 in FIG. 3A. Similar to the description of data validation module 112 in FIG. 1, and data validation module 350 in FIG. 3A, query generation module 450 may generate queries and execute those queries to receive information from data warehouse metadata models regarding warehouse objects in a baseline data warehouse and a target data warehouse. Query generation module 450 may receive the information regarding the warehouse objects, and may generate queries based on the received information regarding the warehouse objects. Query generation module 450 may execute those queries against the baseline data warehouse and the target data warehouse. Object comparison module 452 may receive the information regarding the warehouse objects resulting from the baseline data warehouse and the target data warehouse. Object comparison module 452 may convert the information regarding the warehouse objects into a file (e.g., text file) that contains information regarding the warehouse object in the baseline data warehouse and a file (e.g., text file) that contains information regarding the warehouse object in the target data warehouse, compare the files, and output differences between the files.

Figure 5:
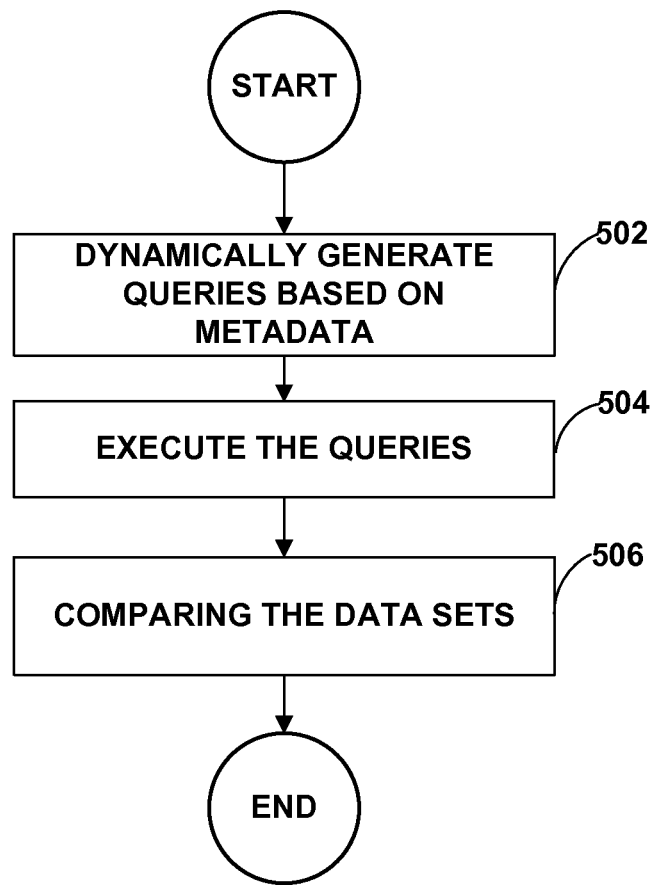
FIG. 5 is a flow chart illustrating an example data validation process according to some aspects of the present disclosure.

FIG. 5 is a flow chart illustrating an example process for data validation in a data warehouse. The process may include dynamically generating one or more database queries to be performed on a target data warehouse 104 and a baseline data warehouse 102 based on warehouse model metadata 110 for the target data warehouse 104 and the baseline data warehouse 102 (502). The process may further include executing the one or more database queries against the target data warehouse 104 and the baseline data warehouse 102 to receive one or more data sets from the baseline data warehouse 102 and one or more data sets from the target data warehouse 104 (504). The process may further include comparing the one or more data sets from the baseline data warehouse 102 and the one or more data sets from the target data warehouse 104 to validate target data 120 in the target data warehouse 104 against baseline data 118 in the baseline data warehouse 102 (506).

In some examples, target data 120 is loaded using a data model that is different from a baseline data model 122 that models the baseline data warehouse 102.

In some examples, the baseline data 118 and the target data 120 may each include one or more warehouse objects. In some examples, each of the one or more warehouse objects includes a fact table 202 that references one or more dimension tables 204. In some examples, comparing the one or more data sets from the baseline data warehouse 102 and the one or more data sets from the target data warehouse 104 further includes comparing the one or more data sets from the baseline data warehouse 102 and the one or more data sets from the target data warehouse 104 to determine if, for a warehouse object in the target data warehouse 104, a foreign key for the respective fact table 202 matches a primary key for a dimension table 204 referenced by the respective fact table 202.

In some examples, for each of the one or more warehouse objects, the warehouse model metadata 300 includes respective one or more of warehouse object metadata 302, and reference metadata 308. In some examples, dynamically generating one or more database queries further comprises generating one or more metadata database queries, executing the one or more metadata database queries to extract information regarding a warehouse object from the warehouse model metadata 302, and dynamically generating the one or more database queries based on the extracted information.

Figure 6A:
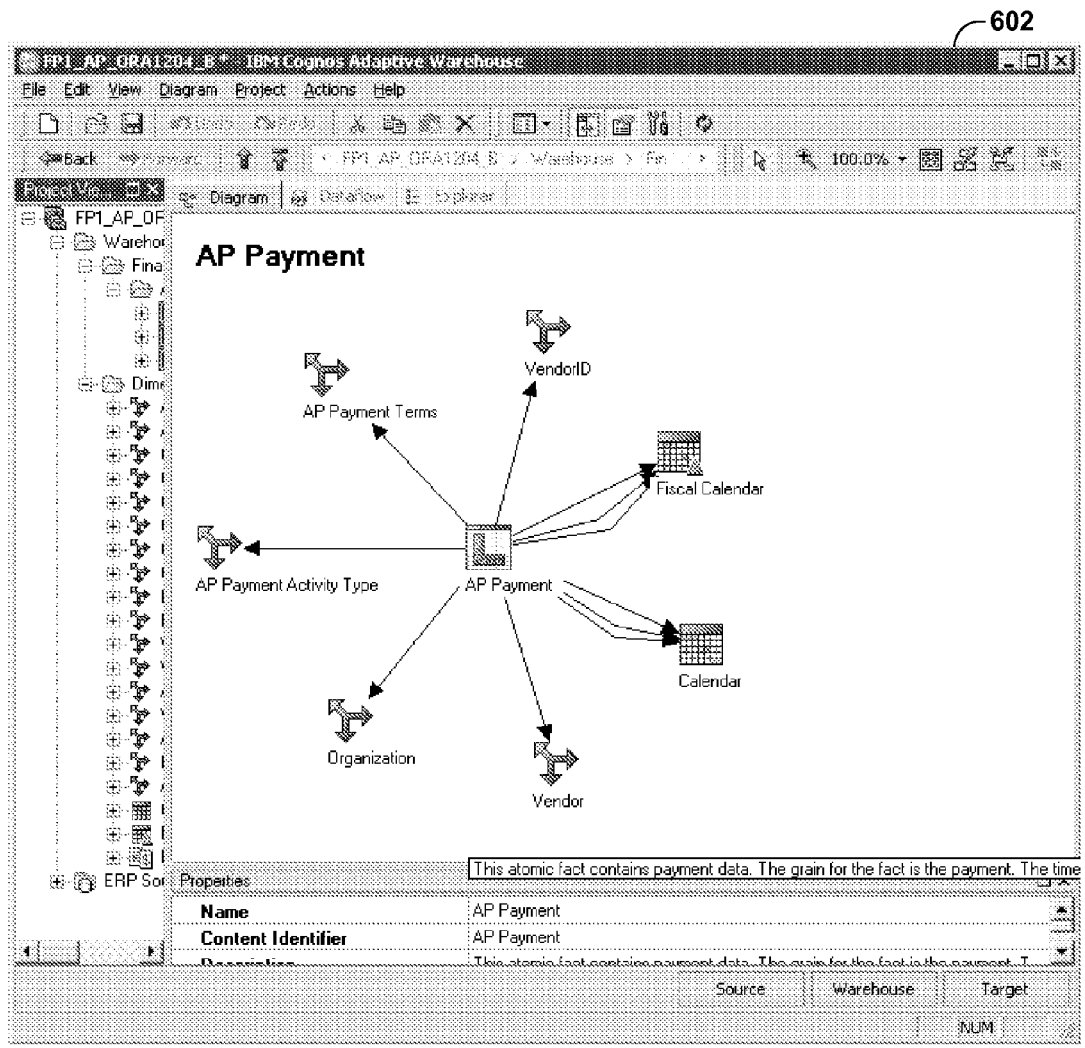
FIGS. 6A-6F illustrate example user interfaces of a data validation tool, according to some aspects of the present disclosure.

FIGS. 6A-6F illustrate example user interfaces of a data validation tool, according to some aspects of the present disclosure. These graphical user interfaces of the data validation tool may enable users to configure the data validation tool to validate data stored in data warehouses. As shown in FIG. 6A, user interface 602 may logically represent an Accounts Payable (AP) Payment warehouse object as an AP Payment fact table that references VendorID, AP Payment Terms, AP Payment Activity Type, Organization, Vendor, Calendar, and Fiscal Calendar dimension tables.

Figure 6B:
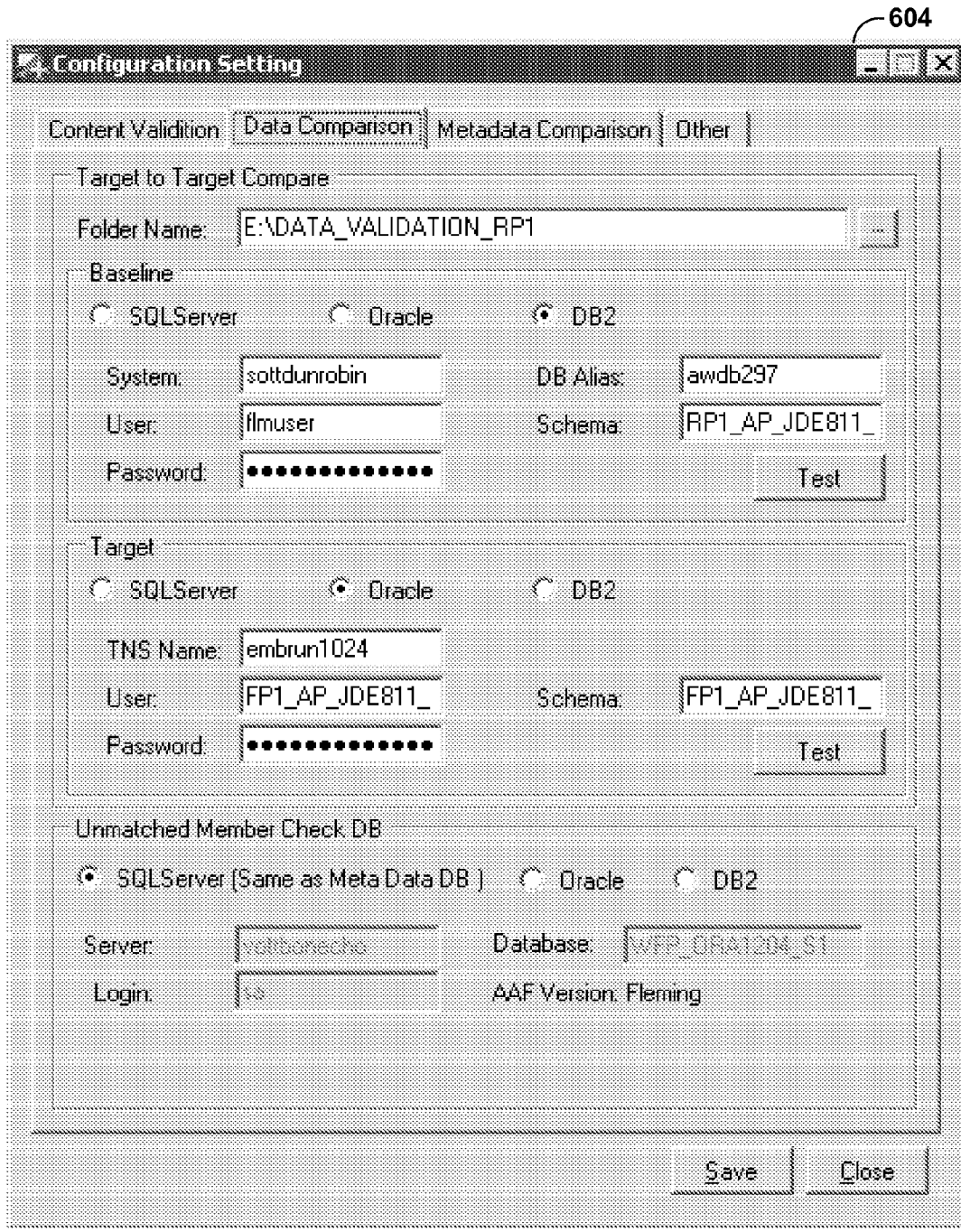

As shown in FIG. 6B, user interface 604 of the data validation tool may enable users to select the baseline data warehouse and the target data warehouse to be compared. As shown in the figure, the baseline data warehouse and the target data warehouse may be the same or different database platforms. User interface 604 may also enable users to enter authentication information for the data warehouses as well as to select the schema for the data warehouses.

Figure 6C:
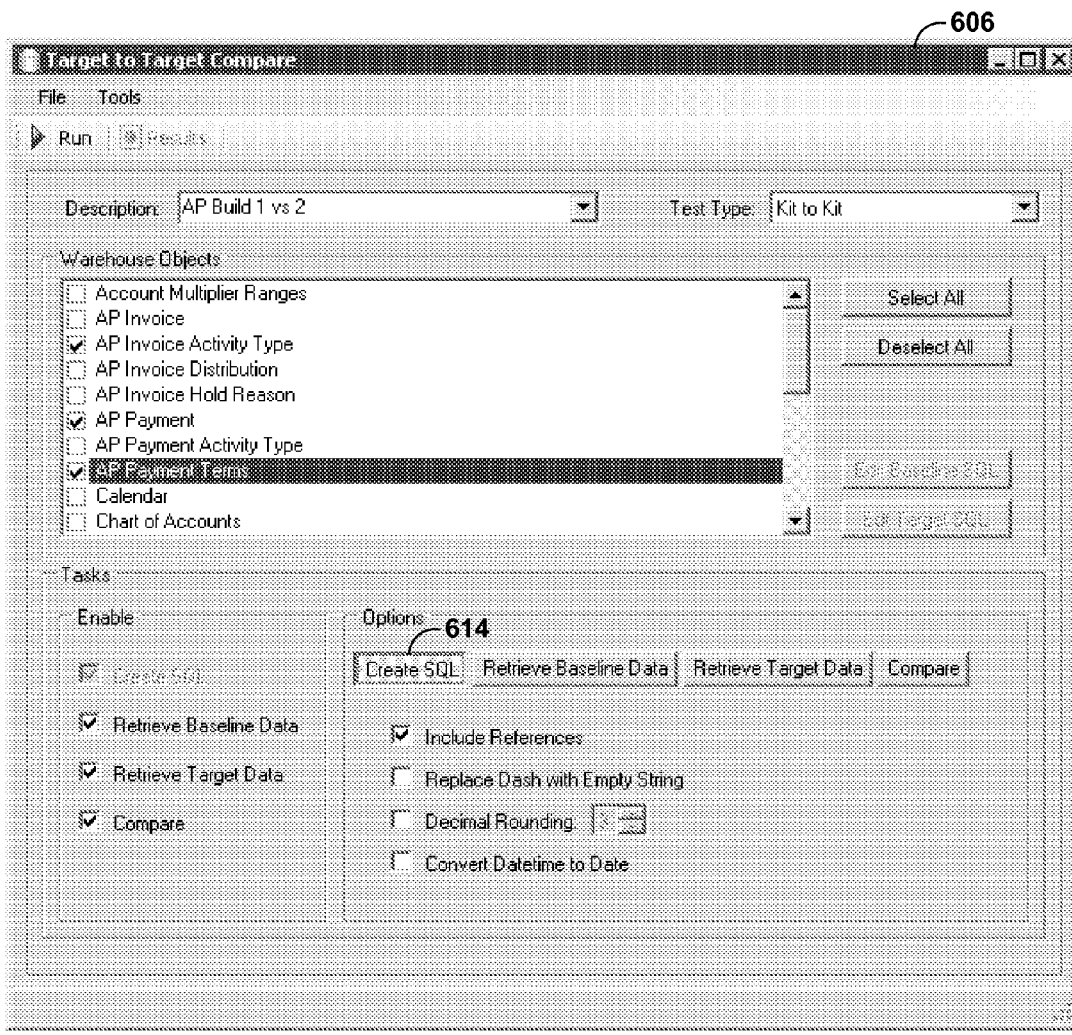
Figure 6D:
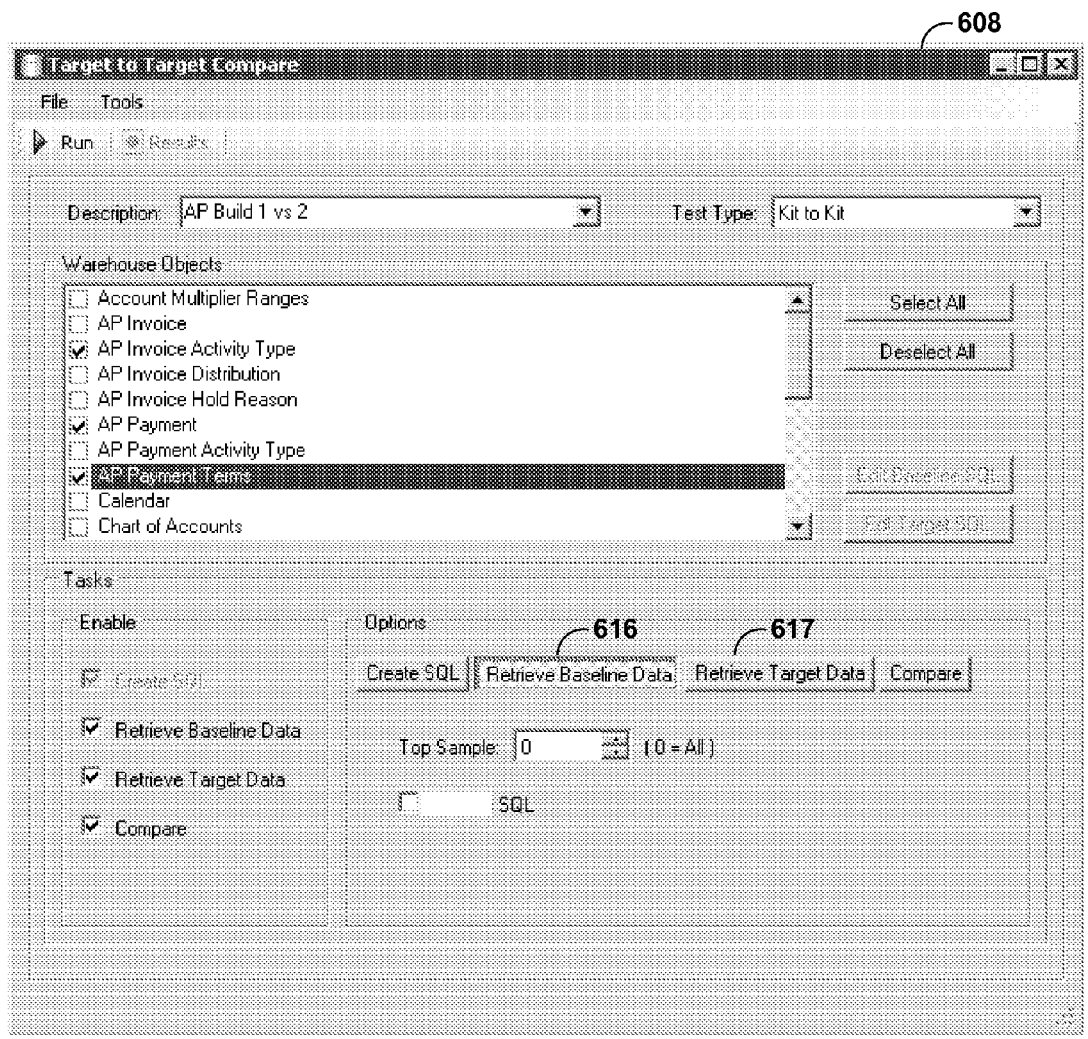
Figure 6E:
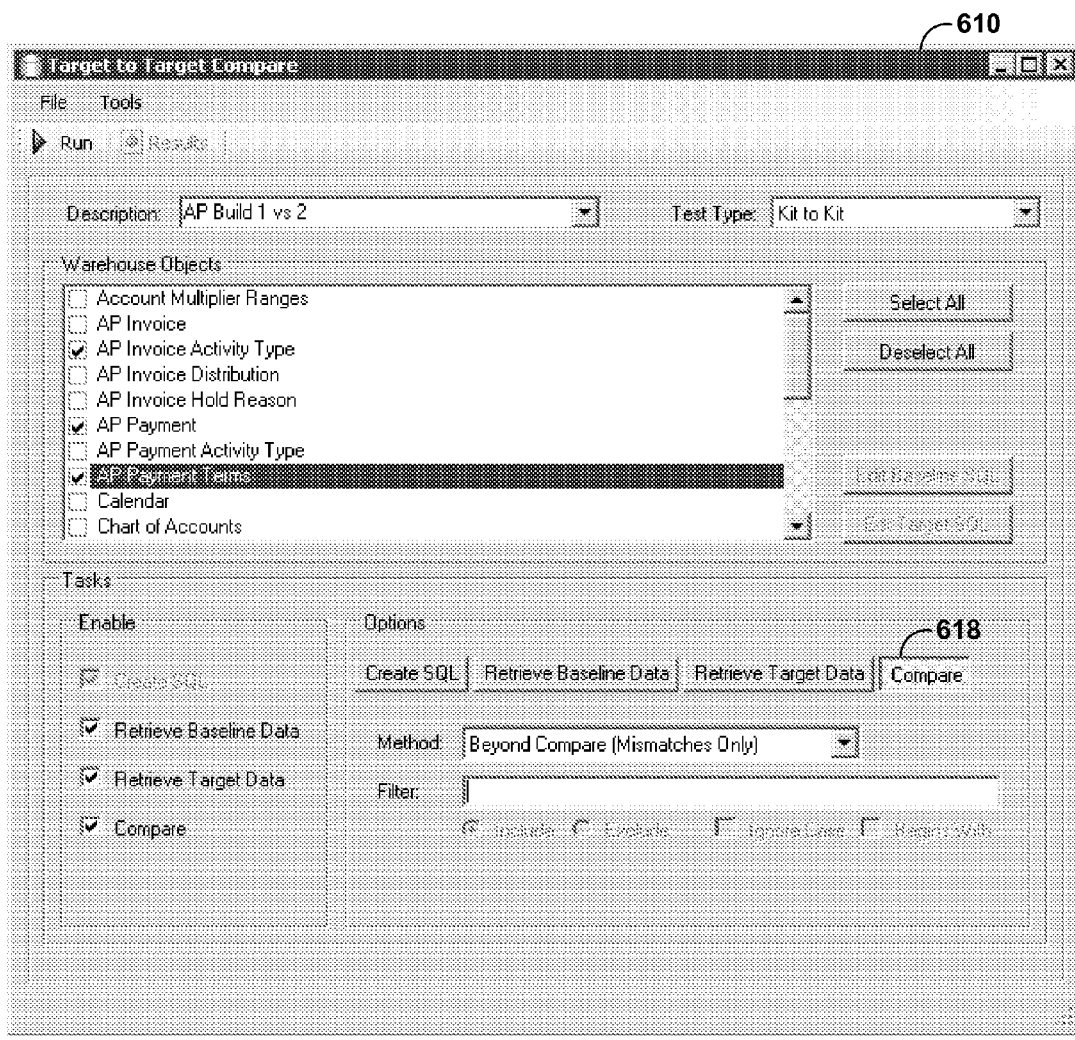

As shown in FIG. 6C, user interface 606 of the data validation tool may enable users to select one or more warehouse objects to compare between the baseline data warehouse and the target data warehouse. User interface 606 may also enable users to direct the data validation tool to dynamically generate queries for the selected warehouse objects via the Create SQL 614 option. As shown in FIG. 6D, user interface 608 of the data validation tool may enable users to specify a sample of data in the baseline and target data warehouses to validate, such as via the Retrieve Baseline Data 616 and Retrieve Target Data 617 options. As shown in FIG. 6E, user interface 610 of the data validation tool may enable users to select the method of comparing data between the baseline data warehouse and the target data warehouse, such as via the Compare 618 option. For example, the method may only return mismatches between the baseline data warehouse and the target data warehouse. The user interface may also enable users to select filtering options, such as string filtering options to be applied on parsed text files before the compare operation is performed.

Figure 6F:
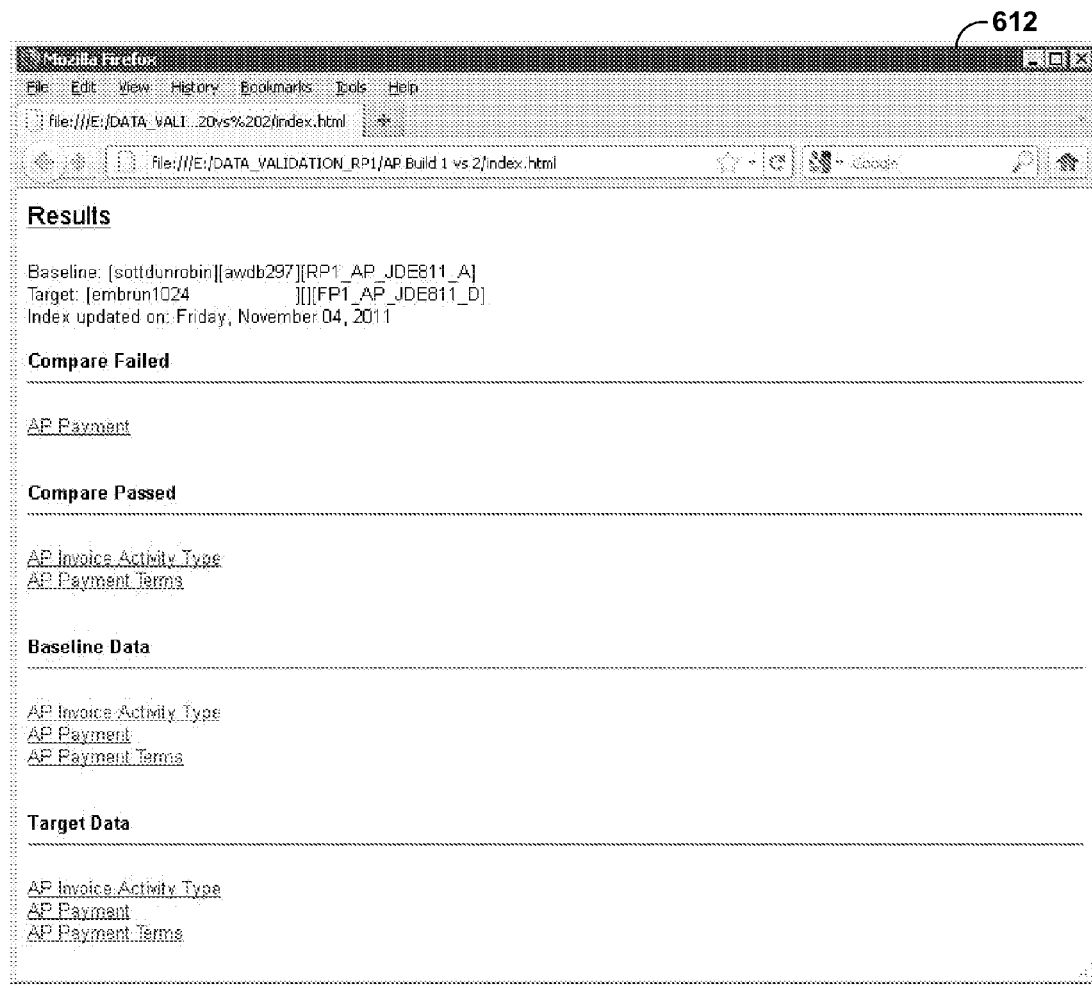

As shown in FIG. 6F, the data validation tool may produce a comparison report 612 that reports the differences or mismatches between the data warehouse objects in the baseline data warehouse and the target data warehouse. The comparison report may, in some examples, be an HTML file that includes a summary of tables where the comparison failed (e.g., there was a mismatch between the table in the target data warehouse in comparison to the corresponding table in the baseline data warehouse) and may also include a summary of tables where the comparison succeeded (e.g., the table in the target data warehouse matches the corresponding table in the baseline data warehouse). In the example shown in FIG. 6F, the comparison report 612 may report the identifies of the baseline data warehouse and of the target data warehouse. The comparison report 612 may also report the tables where the comparison failed, the tables where the comparison passed, and the tables in the baseline and target data warehouses.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Various aspects of the disclosure have been described. These and other aspects are within the scope of the following claims.

I claim:

1. A computer system for validating data in a data warehouse comprising:
    one or more processors;
    one or more computer-readable memories;
    one or more computer-readable tangible storage devices;
    program instructions stored on at least one of the one or more computer-readable tangible storage devices for execution by at least one of the one or more processors via at least one of the one or more computer-readable memories to:
    dynamically generate one or more database queries to be performed on a target data warehouse and a baseline data warehouse based on warehouse model metadata for the target data warehouse and the baseline data warehouse, including:
        generating one or more queries against the warehouse model metadata,
        executing the one or more queries against the warehouse model metadata to extract, from the warehouse model metadata, information regarding a warehouse object, the extracted information indicating one or more dimension tables referenced by a fact table in the warehouse object, and
        dynamically generating the one or more database queries based at least in part on the extracted information;
    execute the one or more database queries against the target data warehouse and the baseline data warehouse to receive one or more data sets from the baseline data warehouse and one or more data sets from the target data warehouse; and
    compare the one or more data sets from the baseline data warehouse and the one or more data sets from the target data warehouse to validate target data in the target data warehouse against baseline data in the baseline data warehouse.

2. The computer system of claim 1, wherein the baseline data and the target data each includes one or more warehouse objects.

3. The computer system of claim 2, wherein one or more of the one or more warehouse objects includes the fact table that references the one or more dimension tables.

4. The computer system of claim 3, wherein compare the one or more data sets from the baseline data warehouse and the one or more data sets from the target data warehouse target data warehouse further comprises:
    compare the one or more data sets from the baseline data warehouse and the one or more data sets from the target data warehouse to determine if, for the warehouse object in the target data warehouse, a foreign key for the respective fact table matches a primary key for a dimension table of the one or more dimension tables referenced by the respective fact table.

5. The computer system of claim 3, wherein for each of the one or more warehouse objects, the warehouse model metadata includes respective one or more of physical object metadata, warehouse object metadata, and reference metadata.

6. A computer program product for validating data in a data warehouse, the computer program product comprising a computer readable storage medium having program code embodied therewith, the program code readable/executable by at least one processor to perform a method comprising:
   dynamically generating, by the at least one processor, one or more database queries to be performed on a target data warehouse and a baseline data warehouse based on warehouse model metadata for the target data warehouse and the baseline data warehouse, including:
      generating one or more queries against the warehouse model metadata,
      executing the one or more queries against the warehouse model metadata to extract, from the warehouse model metadata, information regarding a warehouse object, the extracted information indicating one or more dimension tables referenced by a fact table in the warehouse object, and
      dynamically generating the one or more database queries based at least in part on the extracted information;
   executing, by the at least one processor, the one or more database queries against the target data warehouse and the baseline data warehouse to receive one or more data sets from the baseline data warehouse and one or more data sets from the target data warehouse; and
   comparing, by the at least one processor, the one or more data sets from the baseline data warehouse and the one or more data sets from the target data warehouse to validate target data in the target data warehouse against baseline data in the baseline data warehouse.

7. The computer program product of claim 6, wherein the target data is loaded using a data model that is different from a baseline data model that models the baseline data.

8. The computer program product of claim 6, wherein the baseline data and the target data each includes one or more warehouse objects.

9. The computer program product of claim 8, wherein one or more of the one or more warehouse objects includes the fact table that references the one or more dimension tables.

10. The computer program product of claim 9, wherein comparing the one or more data sets from the baseline data warehouse and the one or more data sets from the target data warehouse target data warehouse further comprises:
   comparing, by the at least one processor, the one or more data sets from the baseline data warehouse and the one or more data sets from the target data warehouse to determine if, for the warehouse object in the target data warehouse, a foreign key for the respective fact table matches a primary key for a dimension table of the one or more dimension tables referenced by the respective fact table.

11. The computer program product of claim 9, wherein for each of the one or more warehouse objects, the warehouse model metadata includes respective one or more of physical object metadata, warehouse object metadata, and reference metadata.

\* \* \* \* \*